United States Patent
Heshmati et al.

(10) Patent No.: US 10,502,571 B2
(45) Date of Patent: Dec. 10, 2019

(54) SYSTEMS AND METHODS FOR DETERMINING A ROUTE TRAVERSED BY A PORTABLE DEVICE

(71) Applicant: INVENSENSE INCORPORATED, San Jose, CA (US)

(72) Inventors: Ardalan Heshmati, Saratoga, CA (US); Rahul Bakshi, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 14/710,511

(22) Filed: May 12, 2015

(65) Prior Publication Data

US 2016/0334218 A1 Nov. 17, 2016

(51) Int. Cl.
| | |
|---|---|
| *G01C 9/00* | (2006.01) |
| *G01C 21/00* | (2006.01) |
| *G01C 21/16* | (2006.01) |
| *G01C 21/20* | (2006.01) |
| *G01B 21/00* | (2006.01) |

(52) U.S. Cl.
CPC ............ *G01C 21/00* (2013.01); *G01B 21/00* (2013.01); *G01C 21/165* (2013.01); *G01C 21/206* (2013.01)

(58) Field of Classification Search
None
See application file for complete search history.

(56) References Cited

U.S. PATENT DOCUMENTS

| | | | |
|---|---|---|---|
| 8,239,277 B2 | 8/2012 | Lee et al. | |
| 8,385,943 B1 | 2/2013 | Han et al. | |
| 2008/0147461 A1* | 6/2008 | Lee | G01C 21/206 |
| | | | 705/7.34 |
| 2009/0326807 A1 | 12/2009 | Ramaswamy et al. | |
| 2010/0318412 A1 | 12/2010 | Karypis et al. | |
| 2012/0095805 A1 | 4/2012 | Ghosh et al. | |
| 2012/0226523 A1* | 9/2012 | Weiss | G06Q 10/00 |
| | | | 705/7.34 |
| 2012/0330722 A1 | 12/2012 | Volpe et al. | |
| 2014/0095281 A1* | 4/2014 | Weiss | G06Q 30/0211 |
| | | | 705/14.13 |
| 2014/0214481 A1 | 7/2014 | Argue et al. | |
| 2014/0244207 A1 | 8/2014 | Hicks | |
| 2016/0258762 A1* | 9/2016 | Taylor | E01H 5/12 |

FOREIGN PATENT DOCUMENTS

| | | |
|---|---|---|
| WO | WO 2010/002387 A1 | 7/2010 |
| WO | WO 2013/070170 A1 | 5/2013 |

* cited by examiner

*Primary Examiner* — Aditya S Bhat
(74) *Attorney, Agent, or Firm* — Bay Area Technology Law Group PC (57) ABSTRACT

Systems and methods are disclosed for determining location information for a portable device by identifying interactions indicating proximity between the user and a plurality of items. Each item may be associated with a known location to establish anchor points such that a route traversed by the portable device may be generated from the established anchor points and motion sensor data output by the portable device.

29 Claims, 4 Drawing Sheets

SYSTEMS AND METHODS FOR DETERMINING A ROUTE TRAVERSED BY A PORTABLE DEVICE

FIELD OF THE PRESENT DISCLOSURE

This disclosure generally relates to techniques for determining a route traversed by a portable device and more particularly to the use of item interactions in conjunction with motion sensor data when determining the route.

BACKGROUND

Current trends in technology have resulted in a proliferation of portable devices that are equipped with various forms of motion sensing capabilities. For example, motion sensors are now commonly included in a wide variety of devices, including mobile phones (e.g., cellular phone, a phone running on a local network, or any other telephone handset), personal digital assistants (PDAs), video game players, video game controllers, activity or fitness tracker devices (e.g., bracelet or clip), smart watches, other wearable devices, mobile internet devices (MIDs), personal navigation devices (PNDs), digital still cameras, digital video cameras, binoculars, portable music, video, or media players, remote controls, or other handheld devices, or a combination of one or more of these devices. The sensors of such devices may be used for determining position or motion, typically by employing navigation techniques based upon the integration of specific forces and angular rates as measured by the motion in order to determine a route traversed by the portable device.

The existence of portable devices with such motion detection capabilities has led to an expanding variety of applications involving the selective delivery of information based on the location context or position of the device. Common examples include navigation aids that may be used to guide a user to a desired destination, social networking applications that may inform the user about others that may be in proximity, and targeted advertising schemes that may provide information relative to the user's location or tracking utilities that may provide information about a user's whereabouts as well as other location based service (LBS) applications. Particularly in a retail context, information regarding the route traversed by a portable device, and by extension, the user, represents a valuable source of information for marketing, product placement and other uses.

Despite the advantages of position determination capabilities, the motion sensors employed by a portable device are often constrained by space, available power, expense and other factors. As a result, such sensors typically suffer from relatively high noise and random drift rates that present challenges when used for navigation purposes and other position determinations. For example, dead reckoning techniques may be used to provide information about the motion of a portable device by determining a traversed route, but the accuracy of such solutions tends to degrade rapidly over time without other independent sources of position information for calibration, in some implementations, a portable device may receive position information from a Global Navigation Satellite System (GNSS) that, under the proper conditions, may provide precise information about the geographic location of the device. However, GNSS performance may be subject to degradation when visibility of the satellites is reduced, such as in an indoor environment. Alternative means for determining the position of a portable device include wireless local area network (WLAN) ranging, positioning based on cellular reception, and other wireless signal triangulation techniques. However, the accuracy of these methods may not be sufficient to properly supplement dead reckoning determinations of a portable device using motion sensors. Other positioning techniques, such as those relying on WiFi™, Bluetooth™, radio frequency identification (RFID) and other near field communication (NFC) systems typically require significant infrastructure investments and/or setup cost.

From the above discussion, it will be appreciated that there remains a need for augmenting the position information of a portable device determined using motion sensors. Further, it would be desirable to provide such supplementation without requiring supporting infrastructure. This disclosure satisfies these and other needs as described in the following materials.

SUMMARY

As will be described in detail below, this disclosure includes a method for determining location information for a portable device associated with a user. The method may include identifying interactions between the user and a plurality of items, such that each interaction indicates proximity of the user with the item, establishing a corresponding plurality of anchor points by associating a known location with each of the plurality of items, obtaining motion sensor data for the portable device for a period of time encompassing the identified interactions and generating a route traversed by the portable device based at least in part on the established anchor points and the motion sensor data.

The disclosure also includes a portable device that may be associated with user. The device may have a motion sensor, a communications module for receiving information identifying interactions between the user and a plurality of items, such that each interaction indicates proximity of the user with the item, and for receiving information associating a known location with each of the plurality of items and a route generator configured to establish an anchor point for each of item using the known location and to derive a route traversed by the portable device based at least in part on data output by the motion sensor and the established anchor points.

Further, the disclosure includes a system for determining location information for a portable device associated with a user. The system may include the portable device having a motion sensor, a database of known locations for a plurality of items and a route generator to identify interactions between the user and a plurality of items, such that each interaction indicates proximity of the user with the item, establish anchor points by associating the known location with each of the plurality of items from the database and derive a route traversed by the portable device based at least in part on the established anchor points and data from the motion sensor of the portable device. In one aspect, map information about a venue may be used to constrain at least a portion of the generated route and in another aspect, the generated route may be used to update such map information.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous aver other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In Wale instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices, if implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only, memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the an to which the disclosure pertains.

Finally, as used in this specification and the appended claims, the singular forms "a," "an" and "the" include plural referents unless the content clearly dictates otherwise.

As noted, techniques exist for determining location or position information for a portable device associated with a user. Motion sensor data may be used with known techniques such as dead reckoning to determine a current position by extrapolating from a previous position based on deduced speed and orientation. Since such techniques may suffer from cumulative errors, the accuracy of a dead reckoning solution may be improved by supplementing the determinations with sources of position information that are independent from the motion sensor navigation system. As used herein, the term "anchor point" means a source of position information that is known without reference to motion sensor data. Accordingly, this disclosure includes identifying interactions between the user and a plurality of items. Each of these items may be established as an anchor point by associating a known location with the item. Correspondingly, the motion sensor data for the portable device for a period of time encompassing the identified interactions may be used to generate a route traversed by the portable device that provides the best fit to the established anchor points. The interaction may involve any relationship that represents proximity between the user and the item. In the following materials, embodiments in a retail context are discussed and suitable interactions include selecting items for purchase and point of sale transactions. However, as will be appreciated, many other interactions constitute sufficient proximity so that a known location of the item may be used as an anchor point when generating the route traversed by the portable device.

Figure 1:
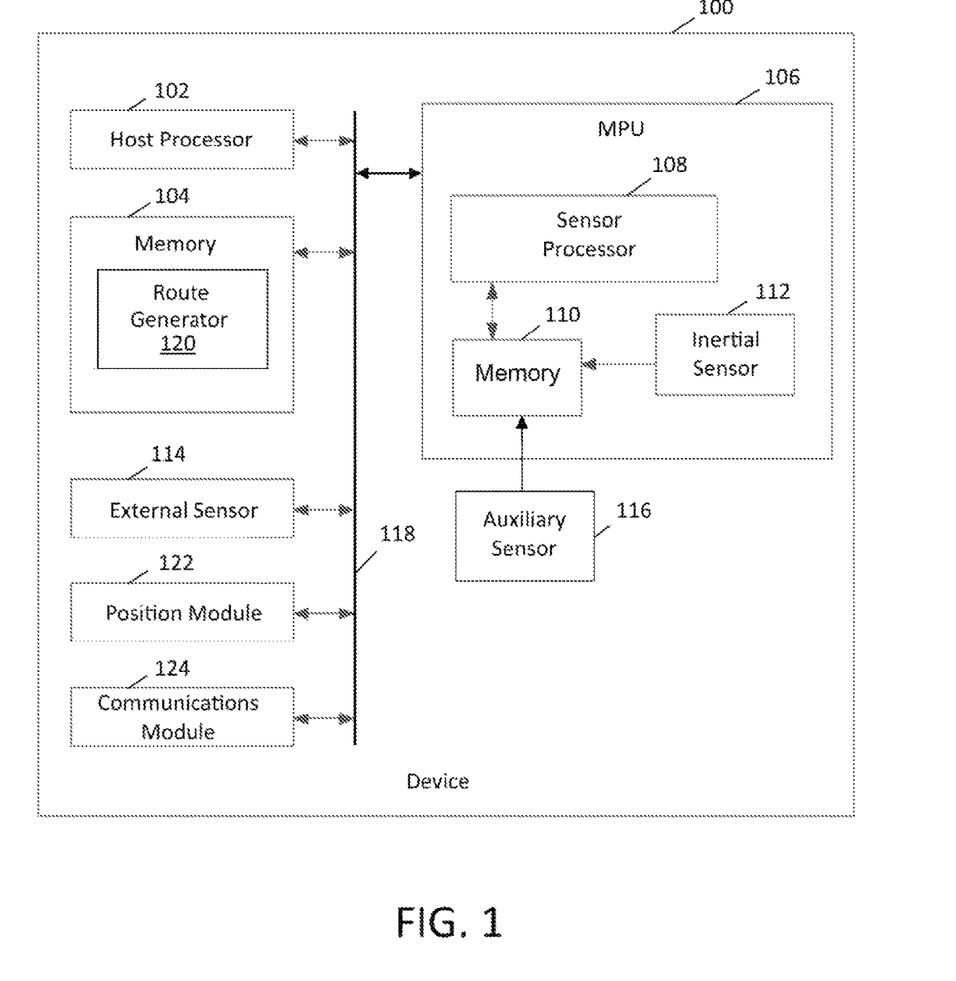
FIG. 1 is a schematic diagram of a portable device having position determination capabilities according to an embodiment.

As noted above, a portable device embodying aspects of this disclosure may include a sensor assembly including inertial sensors providing measurements that may be used to develop or enhance a navigation solution for the portable device and the user by extension. To help illustrate these features, a representative portable device 100 is depicted in FIG. 1 with high level schematic blocks. As will be appreciated, device 100 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, mobile Internet device (MID), personal navigation device (PND), digital still camera, digital video camera, binoculars, telephoto lens, portable music, video, or media player, remote control, or other handheld device, or a combination of one or more of these devices.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the of integrated motion processing unit (MPU™) 106 featuring sensor processor 108, memory 110 and inertial sensor 112. Memory 110 may store algorithms, routines or other instructions for processing data output by inertial sensor 112 and/or other sensors as described below using logic or controllers of sensor processor 108, as well as storing raw data and/o motion data output by inertial sensor 112 or other sensors. Inertial sensor 112 may be one or more sensors for measuring motion of device 100 in space. Depending on the configuration, MPU 106 measures one or more axes of rotation and/or one or More axes of acceleration of the device. In one embodiment, inertial sensor 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 108, or other processing resources of device 100, combines data from inertial sensor 112 to provide a six axis determination of motion. As desired, inertial sensor 112 may be implemented using MEMS to be integrated with MPU 106 in a single package. Exemplary details regarding suitable configurations of host processor 102 and MPU 106 may be found in co-pending, commonly owned U.S. patent application Ser. No. 11/774,488, filed Jul. 6, 1007, and Ser. No. 12/106,921, filed Apr. 11, 1008, which are hereby incorporated by reference in their entirety. Suitable implementations for MPU 106 in device 100 are available from InvenSense, Inc. of San Jose, Calif.

Alternatively, or in addition, device 100 may implement a sensor assembly in the form of external sensor 114. External sensor 114 may represent one or more sensors as described above, such as an accelerometer and/or a gyroscope, that measure motion, as well as sensor(s) for detecting other conditions. As used herein, "external" means a sensor that is not integrated with MPU 106. For example and without limitation, external sensor 114 may also include an optical sensor, such as a digital image sensor, a thermometer, a hygrometer, a barometer, an acoustic sensor, an ambient light sensor or any other sensor that measures characteristics of the environment surrounding device 100, or combination thereof. In the context of this disclosure, external sensor 114 may also include a wireless communication receiver and may correspondingly detect radiofrequency signals. As will be described below, external sensor 114 may be used to obtain a pattern of data that may be associated with a determined location of device 100 for use in a subsequent position determination.

Also alternatively or in addition, MPU 106 may receive data from an auxiliary sensor 116 configured to measure one or more aspects about the environment surrounding device 100. For example, a barometer and/or a magnetometer may be used to refine position determinations made using inertial sensor 112. In one embodiment, auxiliary sensor 116 may include a magnetometer measuring along three orthogonal axes and output data to be fused with the gyroscope and accelerometer inertial sensor data to provide a nine axis determination of motion. In another embodiment, auxiliary sensor 116 may also include a barometer to provide an altitude determination that may be fused with the other sensor data to provide a ten axis determination of motion. Auxiliary sensor 116 may also be used for detecting a pattern of data to be associated with a determined location of device 100.

In the embodiment shown, host processor 102, memory 104, MPU 106 and other components of device 100 may be coupled through bus 118, which may be any suitable bus or interface, such as a peripheral component interconnect express (PCIe) bus, a universal serial bus (USB), a universal asynchronous receiver/transmitter WART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

In one aspect, the various operations of this disclosure used to generate a route traversed by portable device 100 from motion sensor data and established anchor points may be implemented through route generator 120 as a set of suitable instructions stored in memory 104 that may be read and executed by host processor 102. Notably, route generator 120 may utilize motion sensor data, such as from inertial sensor 112 and/or external sensor 114 using a dead reckoning or similar technique to determine a current position of device 100 in relation to a previously determined position. Further, route generator 120 may be configured to provide a best fit between motion of device 100 indicated by the motion sensor data and the established anchor point or points. In one aspect, periods of relatively little motion may correspond to dwell times, during which the user may be interacting with an item. Correspondingly, such dwell times may be expected to correlate with anchor points when generating the traversed route, or highlight proximity with other items of interest to the user.

Other embodiments may feature any desired division of processing between host processor 102, MPU 106 and other resources provided by device 100, or may be implemented using any desired combination of software, hardware and firmware. Alternatively or in addition, any of the operations used to generate a route traversed by portable device 100 from motion sensor data and established anchor points may be performed remotely, such as by a server, or may be divided in any suitable manner between remote and local processing resources.

Multiple layers of software may be employed as desired and stored in any combination of memory 104, memory 110, or other suitable location. For example, a motion algorithm layer can provide motion algorithms that provide lower-level processing for raw sensor data provided from the motion sensors and other sensors. A sensor device driver layer may provide a software interface to the hardware sensors of device 100. Further, a suitable application program interface (API) may be provided to facilitate communication between host processor 102 and MPU 106, for example, to transmit desired sensor processing tasks. As such, aspects implemented in software may include but are not limited to, application software, firmware, resident software, microcode, etc, and may take the form of a computer program product accessible from a computer-usable or computer-readable medium providing program code for use by or in connection with a computer or any instruction execution system, such as host processor 102, sensor processor 108, a dedicated processor or any other processing resources of device 100.

Device 100 may also include position module 122 that employs a reference-based strategy to determine absolute location information. Position module 122 may provide any desired degree of location awareness capabilities. Representative technologies that may be embodied by navigational module 122 include GNSS systems, such as the global positioning system (GPS), the global navigation satellite system (GLONASS), Galileo and Beidou, as well as WiFi™ positioning, cellular tower positioning, Bluetooth™ positioning beacons, or other similar methods. As such, position module 122 may be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the institute of Electrical and Electronics Engineers (IEEE) 802.16 (WiMAX), Long Term Evolution (LTE), IEEE 802.11 (WiFi™) and others may be employed. In embodiments employing position module 122, the absolute location information may be used in conjunction with the inertial navigation techniques of route generator 120.

Further, device 100 may include one or more communication modules 124 for establishing a communications link, which may employ any desired wired or wireless protocol, including the protocols noted above. As desired, communications module 124 may be configured to transmit sensor data, including motion sensor data that may be used to remotely generate a route traversed by device 100 and/or patterns of data that may be associated with a determined location of device 100. Communications module 124 may also be used to receive data used for performing other operations associated with this disclosure, such as receiving a known location for an item with which the user interacts, point of sale information, and/or others.

Figure 2:
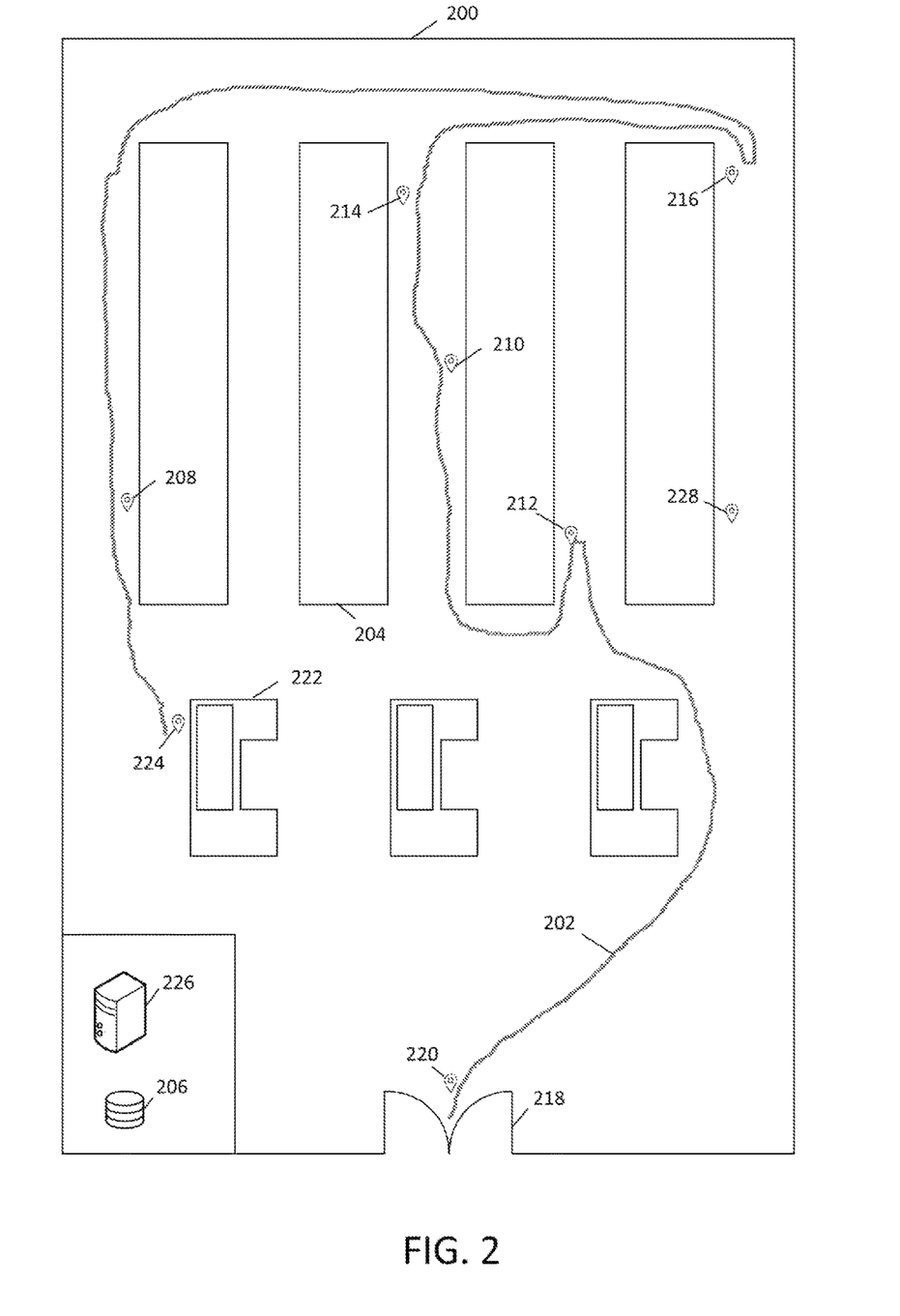
FIG. 2 is a schematic map showing a retail venue within which a route traversed by a portable device may be generated according to an embodiment.

One exemplary embodiment of the techniques of this disclosure is depicted in FIG. 2 in the context of a retail venue represented by store 200. As will be described, several types of interactions between a user and items within store 200 may be identified. Further, a known location may then be associated with the items the user interacts with to establish anchor points so that a best fit calculation or other suitable algorithm may be performed to generate route 202 representing the path traversed by the user through store 200.

A first type of interaction may be determined from a point of sale transaction that lists the product(s) purchased by the user. Each product may have a designated location on shelves 204 within store 200. The product locations may be stored in database 206, maintained by store 200, or may be stored at a remote location. For example, Aisle411™ of Si. Louis, Mo. provides store maps and product shelf databases, although any service offering similar information may be employed. An interaction between the user and each item purchased may be assumed, involving the user taking the item from its shelf location in association with buying it. By associating the known locations of the items, such as from database 206 or other source, an anchor point may be established for each purchased item. As shown in FIG. 2, the user purchased three items, resulting in the establishment of anchor points 208, 210 and 212.

Notably, the establishment of such anchor points provides position information regarding the user, and by association, device 100 in a passive manner without requiring any additional infrastructure. In contrast, conventional methods of tracking shoppers typically involve active beaconing systems in which a transmitter associated with the shopper emits a periodic signal that is picked up by an array of receivers distributed throughout the store or in which a receiver associated with the shopper obtains beacons from an array of transmitters.

It will be appreciated that various other types of interaction may be identified according to the techniques of this disclosure. In one aspect, the user may not purchase a product, but may interact with a display or other fibrin of information terminal. If the display has the capability of identifying the user, the known location of the display may be used to establish an anchor point, such as anchor point 214.

An item may also be identified based on an intent of the user to purchase or interact with the item. As an example, prospective items that the user may interact with may be identified from a shopping list or other analogous source of information that the user may store on device 100. One potential source for such information is an application that may run on device 100 provided by store 200 in conjunction with a customer reward program or the like. Data mining techniques may also be applied to the user's communications, when available or allowed, to identify items for which there is an intent to purchase.

As another non-limiting example, the user may use an optical sensor, such as external sensor 114 of device 100, to scan a barcode or take a picture of a product in order to obtain information about the product or for other purposes. Again, by determining a known location of the item, an anchor point such as anchor point 216 may be established.

Yet another example of interaction between the user and an item indicating sufficient proximity to impute a known location of the item to the user may exist when the user enters the store. It may be assumed that the user enters store 200 through doors 218. Accordingly, given that the location of doors 218 is known, anchor point 220 may be established.

A further example of item interaction may occur at point of sale. The retail transaction may indicate which register 222 was used for check out, allowing for the establishment of anchor point 224.

As will be recognized, other types of interaction may exist that indicate proximity between a user and an item having a known location such that an anchor point may be established. These techniques may be applied to generate a route traversed by device 100 in any suitable venue, including office buildings, museums, libraries, galleries, sporting arenas, government buildings and the like. In contexts other than retail, such interactions may include logging in to a computer, swiping a key card, capturing a recognizable image with an optical sensor, and many others. The scope of this disclosure is not to be limited to these representative examples and any interaction indicating proximity with an item of known location may be employed.

As noted, in one embodiment the established anchor points and the motion sensor data from device 100 may be utilized by route generator 120, such as by running a best fit algorithm, to generate a route that incorporates the established anchor points. Alternatively, or in addition, device 100 may utilize communications module 124 to transmit motion sensor data to server 226, which may be on the premises of store 200 as depicted or at any other remote location. In turn, server 226 may also receive point of sale information, such as from register 222, item location information, such as from database 206, and/or other indications of interaction between the user and one or more items in order to generate a route traversed by device 100.

In the example discussed above, a list of items purchased as determined at register 222 identifies the items with which the user has interacted. These techniques may also be applied to other retail models. For example, some stores may employ "smart" shopping carts that identify and/or sell items as they are added to the cart using RFID or equivalent technology. In another example, sales may be finalized by scanning products as the user exits the store. Yet another example is the use of device 100, or another dedicated device, to create a virtual shopping cart by scanning display items to create a purchase order that then may be fulfilled from a warehouse. As such, these and other methods of transaction constitute point of sale information that may be used to identify items with which the user has interacted or is interacting.

Further, situations exist that may allow for the determination of relative timing for two or more established anchor points. Such relative timing information indicates the sequence in which the user interacted with the corresponding items and may significant facilitate the determination of the route traversed by route generator 120 and/or server 226. For example, an established anchor point associated with the point of sale, such as anchor point 224, may be determined to occur later in sequence than interactions with the items purchased. Similarly, an established anchor point associated with entry to store 200, such as anchor point 220, may be determined to occur earlier in the sequence. Still further, some anchor points may provide absolute timing information that may be used to determine their sequence in relation to other anchor points. For example, point of sale information may include the checkout time. In other implementations, point of sale information associated with a smart or virtual shopping cart may provide absolute time information as each item is scanned. Likewise, interactions with a display as noted for anchor point 214 and/or scanning an item with an optical sensor to obtain product information may also provide absolute timing information.

While relative timing information indicating the sequencing of anchor points may be employed to help generate route 202, absolute or relative timing information for one or more anchor points may be propagated to all points along route 202 using the time stamps associated with the motion sensor data after route generation. For example, the time stamps may constitute a time line for the generated route, such that a time period for any location along the route may be determined in reference to timing information associated with at least one of the established anchor points. As will be discussed in further detail below, this correspondingly allows a pattern of data recorded by any sensor or combination of sensors of device 100, including inertial sensor 112, external sensor 114 and auxiliary sensor 116, to be correlated with the position indicated by route 202 at the time the pattern was recorded. Subsequent identification of a similar pattern of data may be used to impute the corresponding position to any device detecting such a pattern.

As desired, the route generation techniques of this disclosure employing motion sensor data and the establishment of anchor points by item interaction may be enhanced by other navigation techniques. For example, device 100 may have a source of absolute position information, such as GNSS or wireless signal positioning, that may be integrated to improve the accuracy of the generated route when such absolute position information is available. Alternatively or in addition, map information may exist for store 200 or any other location for which these techniques are applied. Correspondingly, the generation of the traversed route 202 may be constrained by features associated with the map information, such as by assuming the user must be moving along the aisles and other passageways and not moving through shelves 204 or other fixed objects. In yet another aspect, the generated route may be used to build or update map information by employing the same reasoning. Notably, the concepts may be extended to information aggregated from multiple visits and/or multiple users. A preponderance of the generated routes may be used to validate item location information, derive map information, gather environmental sensor data, or for any other purpose.

In one aspect, the established anchor points may be weighted by a suitable confidence factor when fitting the motion sensor data to generate the route. For example, items identified as being intended purchases may be afforded less weight than items identified as actually being purchased. Similarly, if ambiguity exists regarding an interaction, such as if there is more than one entryway or if the specific register used for check out is not identified, the weight given the corresponding anchor point may be reduced.

From the above, it will be appreciated that anchor points may be established after the user interaction has occurred. For example, for a purchased product, it may not be possible to determine the user has interacted with the item until point of sale information becomes available, such as when the user finalizes the transaction. Nevertheless, once the item interaction is identified, the anchor point may be established and route generated by reconstruction from the recorded motion sensor data. However, in other scenarios, the anchor point may be established contemporaneously with the item interaction, in real time. As noted above, smart or virtual shopping cart technologies may indicate the interaction as it is occurring, as will an interactive display, checking out at a register and others. When an anchor point is established contemporaneously, it may be desirable to update a navigational solution for device 100 using the known location of the item. For example, the known location may be used as a calibration to correct for sensor drift or other errors during dead reckoning navigation.

As shown in FTC. 2, generating a route traversed by device 100 in some embodiments may involve a determination that excludes one or more potential anchor points. For example, anchor point 228 may correspond to the known location of an item indicated as being purchased by the user. However, if the motion sensor data does not permit ready integration of anchor point 228 into generated route 202, that anchor point may be excluded from the route under the assumption that it is erroneous, due to the database having incorrect information, the actual purchased item being in a location other than designated, or other similar reasons. In a further aspect, the identification of such potential anchor points that do not fit the motion sensor data may be used to update or correct the item location information. Such aspects may be of particular use when generated routes from multiple users or multiple visits are aggregated, since the existence of a single or few anomalies may not indicate erroneous information but a repeated pattern may provide more confidence that the location information or map information should be updated.

According to the techniques of this disclosure, a route traversed by device 100 over a period of time may be generated from motion sensor data and the establishment of anchor points corresponding to item interactions. Correspondingly, the generated route provides information regarding the position of device 100 over that period of time.

In one aspect, this information may be used to leverage additional position determination techniques. As described, the portable devices of this disclosure, such as device 100, may be equipped with a wide range of sensing capabilities. In addition to motion sensors, any number of additional sensors may be present that are capable of detecting environmental and other conditions that may be characteristic of a specific position. Such sensors may include an optical sensor, such as a digital image sensor, a magnetometer, a thermometer, a hygrometer, a barometer, an acoustic sensor, an ambient light sensor or the like. Further, a wireless communication receiver may considered a sensor for RIF signals. Any combination of sensing capabilities of device 100 may be used to determine one or more patterns of data that are sufficiently distinct to be correlated with a specific location. In turn, subsequent detection of such a pattern may allow a determination that the device detecting the pattern is in the location corresponding to that pattern. In effect, the pattern of data constitutes a "fingerprint" that identifies a specific location. As will be appreciated, the success of such positioning techniques is positively related to the number of locations for which a fingerprint exists.

Conventionally, extensive surveys may be employed to record the various patterns of data and their associated locations, both initially and for maintenance purposes, but this represents a considerable expenditure of resources. In contrast, the techniques of this disclosure allow a portable device already employed by the user for other purposes to gather the requisite information. Notably, "crowdsourcing" by aggregating data from multiple users and/or over multiple visits may substantially increase the amount of data available for fingerprinting and enhance the viability of using such fingerprints to determine position information for a portable device.

As will be appreciated, the noted growth in usage of portable devices having sophisticated sensing capabilities represents a significant amount of potential information that may be exploited using the techniques of this disclosure. Many portable devices already record a variety of sensor information when in common use, such as in the implementation of navigational applications. This sensor data, which is already being gathered, may then be harnessed for the purposes described herein with little additional expenditure of resources, in terms of processing, power consumption or the like. Since the information represents data from actual users, it may be more accurate or otherwise more suitable than data obtained through modeling or experiment. Further, by distributing the information gathering among a plurality of users, considerable advantages of coverage and redundancy may be gained. Still further, the value of this information may be significantly enhanced by associating behavior and other user characteristics, such as may be determined using the portable device. In short, collating sensor data from a plurality of users at a plurality of times and locations may benefit any number of applications, including the above position determination techniques and the user analytics described next as well as others.

In another aspect, the generated route traversed by device 100 represents a valuable source of information regarding the behavior of the user. For example, in a retail context, the traversed route provides analytics regarding a wide range of consumer behavior. The activity of the user is of considerable interest to retailers, manufacturers, advertisers and other commercial entities. The analytics may be used for designing store layout and product placement to enhance sales, as well as offering insight into successful packaging designs, advertising strategies and similar methods of influencing purchasing decisions, in one embodiment, such analytics may include the sequence in which items are selected for purchase and the demographics associated with purchase sequence and/or the traversed route. Periods of reduced motion may also be associated with one or more anchor points to determine dwell times during which the user is interacting with the corresponding item. This may be used to analyze the amount of time the user spent selecting a product, wait times during checkout or payment and other related information. Additionally, The analytics may also be aggregated to provide characterization of one or multiple demographics of a plurality of users, of different stores or locations, of different times of day, and the like. Analytics may also be aggregated for one user at one or multiple locations in order to assess changing patterns of behavior. As will be appreciated, a variety of other information may be derived from the generated route traversed by device 100, all of which are within the scope of this disclosure.

Figure 3:
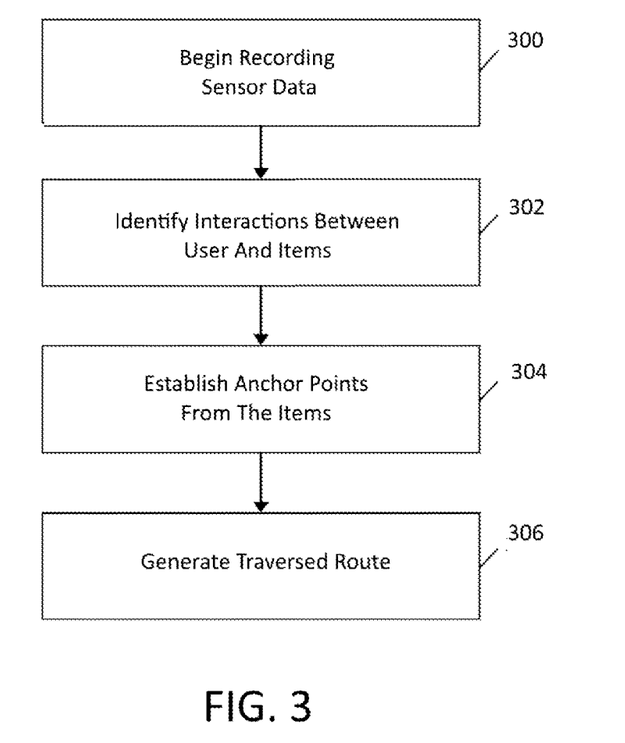
FIG. 3 is a flowchart showing a routine for generating a route traversed by a portable device according to an embodiment.

Further aspects of this disclosure are illustrated with respect to the flowchart shown in FIG. 3, which represents a routine for generating a route traversed by device 100. Beginning with 300, device 100 may begin recording sensor data, including motion sensor data, such as from inertial sensor 112, as well as environmental or other sensor data as desired, such as from external sensor 114 and/or auxiliary sensor 116 or any other type of sensor of device 100. Interactions between the user and a plurality of items then may be identified in 302. As described above, point of sale information and other suitable source may be used for the identifications. The interaction may be any that allows inference of proximity of the user with the item. In 304, anchor points may be established corresponding to the items by associating a known location with each item. In one embodiment, database 206 may be used to provide the known location of the items. Correspondingly, a route traversed by device 100 may be generated using the established anchor points and the recorded motion sensor data in 306.

Figure 4:
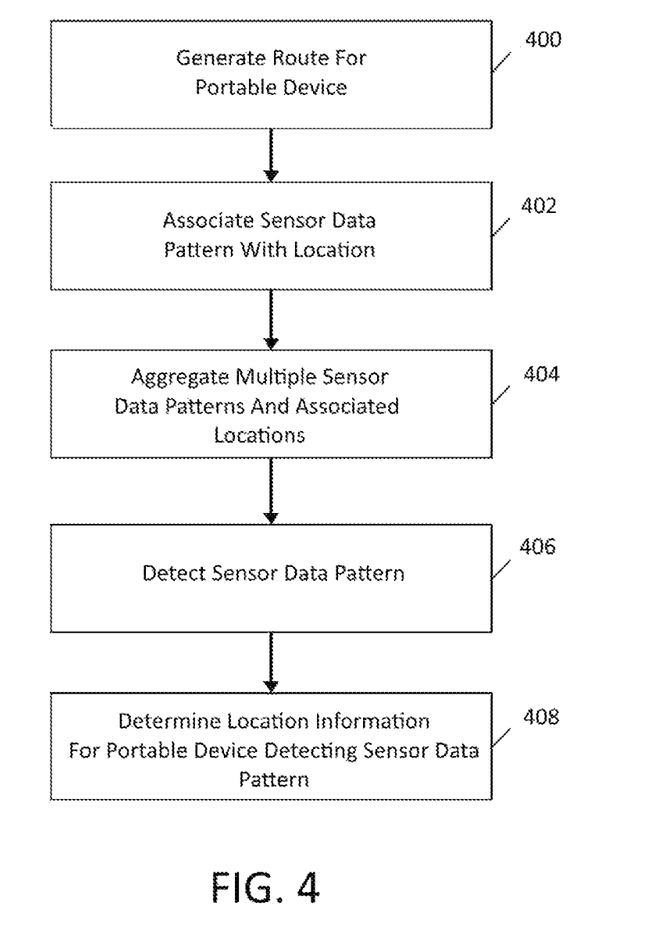
FIG. 4 is a flowchart showing a routine for determining location information by detecting a sensor data pattern according to an embodiment.

In another exemplary embodiment, the techniques of this disclosure may be employed to determine location information for a portable device by detecting a characteristic sensor data pattern, or fingerprint, associated with a known location as represented by the flowchart shown in FIG. 4. Beginning with 400, a route may be generated for a portable device, such as device 100. A sensor data pattern previously recorded by the device then may be associated a location along the generated route in 402. The sensor data pattern may include any combination of information from any combination of sensors as discussed, including without limitation inertial sensor 112, external sensor 114 and/or auxiliary sensor 116. In 404, multiple sensor data patterns with associated multiple locations may be aggregated into a database. In one aspect, the database may be maintained locally on device 100, such as with position module. However, in a broader aspect, the sensor data pattern and location database may be maintained by a server, such as server 226 or any other suitable remote location. As will be appreciated, remote aggregation of sensor data patterns and associated locations may leverage information obtained from a plurality of devices by employing crowd sourcing techniques as described above. Subsequently, in 406, the same or a different portable device may detect a sensor data pattern. Correspondingly, the detected sensor pattern may be correlated with an associated location using the aggregated database to determine location information for the portable device detecting the sensor data pattern.

The techniques described above may be implemented using any suitable sensor technology. In one aspect but without limitation, one or more sensors of device 100 may be based on microelectromechanical systems (MEMS). In many situations, operations known as sensor fusion may involve combining data obtained from multiple sensors to improve accuracy and usefulness of the sensor data, such as by refining orientation information or characterizing a bias that may be present in a given sensor. For example, many motion tracking systems combine data from a gyroscope, an accelerometer and a magnetometer.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a motion tracking module also referred to an MPU as noted above that includes at least one sensor in addition to electronic circuits. The sensor, such as a gyroscope, a compass, a magnetometer, an accelerometer, a microphone, a pressure sensor, a proximity sensor, or an ambient light sensor, among others known in the art, are contemplated. Some embodiments include accelerometer, gyroscope, and magnetometer, which each provide a measurement along three axes that are orthogonal relative to each other referred to as a 9-axis device. Other embodiments may not include all the sensors or may provide measurements along one or more axes. The sensors may be formed on a first substrate. Other embodiments may include solid-state sensors or any other type of sensors. The electronic circuits in the MPU receive measurement outputs from the one or more sensors. In some embodiments, the electronic circuits process the sensor data. The electronic circuits may be implemented on a second silicon substrate. In some embodiments, the first substrate may be vertically slacked, attached and electrically connected to the second substrate in a single semiconductor chip, while in other embodiments, the first substrate may be disposed laterally and electrically connected to the second substrate in a single semiconductor package.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for determining location information for a portable device associated with a user comprising:
   traversing a route with the portable device over a first period of time;
   obtaining motion sensor data from the portable device for the first period of time;
   establishing a plurality of anchor points at a time subsequent to the first period of time, wherein the anchor points are derived from point of sale information by associating known locations with products purchased by the user and wherein the anchor points and the portable device do not exchange signals; and
   determining location information for the route traversed by the portable device based at least in part on the established anchor points and the motion sensor data.

2. The method of claim 1, wherein at least one additional anchor point is established based at least in part on the user capturing an image of an item using an optical sensor of the portable device.

3. The method of claim 1, wherein at least one additional anchor point is established based at least in part on an intended purchase of the user.

4. The method of claim 1, wherein known locations are associated with products purchased by the user based at least in a part on a database of item locations.

5. The method of claim 1, further comprising determining a relative timing sequence for at least two of the anchor points.

6. The method of claim 5, wherein the relative timing sequence is based at least in part on a purchase time.

7. The method of claim 1, further comprising establishing at least one additional anchor point contemporaneously.

8. The method of claim 7, further comprising updating a navigation solution for the portable device based at least in part on the contemporaneously established anchor point.

9. The method of claim 1, wherein location information for the route traversed by the portable device is determined based at least in part on a dead reckoning technique.

10. The method of claim 1, wherein location information for the route traversed by the portable device is determined based at least in part on map matching.

11. The method of claim 1, further comprising obtaining at least one source of absolute location information wherein the determined location information incorporates the absolute location information.

12. The method of claim 1, further comprising deriving map information based at least in part on the determined location information.

13. The method of claim 1, further comprising aggregating determined location information for multiple routes for a venue and deriving map information.

14. The method of claim 1, further comprising aggregating determined location information for multiple routes for a venue and updating location information for at least one of the anchor points.

15. The method of claim 1, further comprising excluding a potential anchor point from the determined location information.

16. The method of claim 1, wherein at least one additional anchor point provides absolute timing information.

17. The method of claim 1, further comprising:
   characterizing a pattern of sensor data with the portable device at a first point in time;
   determining a location of the portable device at the first point in time along the route; and
   associating the sensor data pattern with the determined location.

18. The method of claim 17, wherein determining the location of the portable device at the first point in time along the route is determined in reference to timing information associated with least one anchor point.

19. The method of claim 17, further comprising aggregating multiple sensor data patterns and associated determined locations.

20. The method of claim 19, wherein the multiple sensor data patterns are aggregated from a plurality of portable devices.

21. The method of claim 20, further comprising:
   building a database of locations corresponding to the aggregated multiple sensor data patterns;
   detecting a sensor data pattern with a same or different portable device; and
   correlating the detected sensor data pattern with a sensor data pattern in the database to determine location information for the same or different portable device.

22. The method of claim 1, wherein user analytics are derived based at least in part on the determined location information.

23. The method of claim 22, wherein user analytics are aggregated across at least one of different venues, different time periods and user demographics.

24. The method of claim 22, wherein user analytics are aggregated for a single user across multiple visits to a single venue.

25. The method of claim 22, wherein user analytics are aggregated for a single user across visits to multiple venues.

26. The method of claim 22, wherein user analytics comprise a dwell time associated with one of the anchor points.

27. The method of claim 22, wherein user analytics comprise correlating a dwell time with a first location along the route to assess interest in an item known to be at the first location.

28. A portable device associated with a user comprising:
 a motion sensor configured to output motion sensor data corresponding to a route traversed with the portable device over a first period of time;
 a communications module for receiving point of sale information at a time subsequent to the first period of time; and
 a route generator configured to:
  establish a plurality of anchor points, wherein the anchor points are derived from the point of sale information by associating known locations with products purchased by the user and wherein the anchor points and the portable device do not exchange signals; and
  determine location information for the route traversed by the portable device based at least in part on data output by the motion sensor and the established anchor points.

29. A system for determining location information for a portable device associated with a user comprising:
 the portable device having a motion sensor configured to output motion sensor data corresponding to a route traversed with the portable device over a first period of time;
 a database of known locations for a plurality of products; and
 a route generator, wherein the route generator is configured to:
  establish a plurality of anchor points at a time subsequent to the first period of time, wherein the anchor points are derived from point of sale information by associating known locations from the database with products purchased by the user and wherein the anchor points and the portable device do not exchange signals; and
  determine location information for the route traversed by the portable device based at least in part on the established anchor points and data from the motion sensor of the portable device.

* * * * *